United States Patent [19]

Christie et al.

[11] Patent Number: 5,128,385
[45] Date of Patent: Jul. 7, 1992

[54] PHOTOCROSSLINKABLE THERMOPLASTIC URETHANE COATING SYSTEM

[75] Inventors: Peter A. Christie, Lancaster, Pa.; Charles E. Hoyle, Hattiesburg, Miss.

[73] Assignee: Armstrong World Industries, Inc., Lancaster, Pa.

[21] Appl. No.: 168,194

[22] Filed: Mar. 15, 1988

Related U.S. Application Data

[60] Continuation-in-part of Ser. No. 819,421, Jan. 16, 1986, abandoned, which is a division of Ser. No. 650,208, Sep. 13, 1984, Pat. No. 4,598,009.

[51] Int. Cl.$^5$ .................. C08G 18/30; C08G 18/62; C08J 3/28
[52] U.S. Cl. ........................ 522/33; 522/46; 522/108; 525/440; 528/75
[58] Field of Search ................ 522/108, 33, 46

[56] References Cited

U.S. PATENT DOCUMENTS

| | | | |
|---|---|---|---|
| 3,036,042 | 5/1962 | Schmidt | 528/66 |
| 3,677,920 | 7/1972 | Kai | 430/285 |
| 3,960,572 | 6/1976 | Ibata | 522/97 |
| 4,138,299 | 2/1979 | Bolgiano | 427/54 |
| 4,139,436 | 2/1979 | Sasani | 522/96 |
| 4,198,238 | 4/1980 | Scheve | 430/286 |
| 4,210,693 | 7/1980 | Regan | 428/152 |
| 4,225,374 | 9/1980 | Kaufman | 156/220 |
| 4,235,686 | 11/1980 | Dart | 522/108 |
| 4,293,599 | 10/1981 | Mori | 427/274 |
| 4,358,476 | 11/1982 | Zimmer | 427/44 |
| 4,393,187 | 7/1983 | Boba | 528/60 |
| 4,430,502 | 12/1983 | Conley | 427/54.1 |

FOREIGN PATENT DOCUMENTS

| | | |
|---|---|---|
| 82503 | 7/1978 | Japan . |
| 62803 | 5/1981 | Japan . |
| 744027 | 1/1956 | United Kingdom . |
| 754604 | 8/1956 | United Kingdom . |
| 815839 | 7/1959 | United Kingdom . |
| 1182423 | 2/1970 | United Kingdom . |
| 1243703 | 8/1971 | United Kingdom . |
| 1313562 | 4/1973 | United Kingdom . |
| 1348573 | 3/1974 | United Kingdom . |
| 1424443 | 2/1976 | United Kingdom . |
| 1447674 | 8/1976 | United Kingdom . |
| 1508325 | 4/1978 | United Kingdom . |
| 2002009 | 2/1979 | United Kingdom . |
| 2006241 | 5/1979 | United Kingdom . |
| 2010880 | 7/1979 | United Kingdom . |
| 2059983 | 4/1981 | United Kingdom . |
| 2073763 | 10/1981 | United Kingdom . |
| 2112406 | 7/1983 | United Kingdom . |

OTHER PUBLICATIONS

Derwent Abstract 78-61292A/34 for Mitsubishi 82503 of Jul. 1978, & Translation.
Derwent Abstract 81-52254 D/29 for Mitsubishi 62803 of May 1981 & Translation.
D. J. Williams "Polymer Science & Engineering", Prentice Hall, 1971 pp. 9-10.
Kosar "Light-Sensitive Systems", John Wiley & Sons, 1965 pp. 170, 171, 172.

Primary Examiner—Marion E. McCamish
Assistant Examiner—A. H. Koeckert

[57] ABSTRACT

The invention is directed to a coating system which is adaptable to being crosslinked subsequent to being embossed. The system comprises a linear polyurethane that contains sites of unsaturation only in its polymeric backbone and a photoinitiator. The polyurethane is produced by the reaction of a diisocyanate and an unsaturated polyester diol.

14 Claims, No Drawings

PHOTOCROSSLINKABLE THERMOPLASTIC URETHANE COATING SYSTEM

This is a continuation-in-part of U.S. application Ser. No. 819,421 now abandoned, filed Jan. 16, 1986, which was a division of our earlier application Ser. No. 650,208 filed Sep. 13, 1984 now U.S. Pat. No. 4,598,009.

SUMMARY OF THE INVENTION

Utilizing polyurethanes in photoreactive polymer systems is known in the art. Generally, such systems are unsaturated acrylate or methacrylate terminated polyurethanes obtained by the reaction of hydroxyalkyl acrylate or methacrylate esters or N-metholacrylamide with isocyanate end groups in the polyurethanes and require, in addition to the polyurethane, at least one added polymerizable monomer to cause a photocrosslinking reaction.

Such prior art photoreactive systems are applied to a substrate in liquid form and, as such, cannot be effectively embossed. Coatings embossed in such a fluid state would not retain any dimensionality and would flow and level. Such coatings could only be embossed after being converted via irradiation to a cured, cross-linked, network and, as such, could not be embossed very sharply. In other photoreactive polymer systems, such as those used in imaging systems, a photoactive unsaturated side chain or a pendant substituent such as cinnamate or benzylideneacetone is required to produce the desired photocrosslinking.

The present invention provides for tack-free, non-liquid, thermoplastic film that, unlike the prior art liquid photoreactive systems discussed above, can be embossed prior to being crosslinked and thus, can be embossed much more sharply than a film capable of being embossed only after crosslinking. Upon being crosslinked, the film will be converted to a product with a sharp, clearly defined, permanently embossed surface.

Such desirable characteristics are realized by a photoreactive coating system that is comprised of (a) a linear polyurethane that contains sites of unsaturation, that is, carbon-carbon double bond moieties, only in its polymeric backbone and (b) a photoinitiator. The polyurethanes utilized in the coating system of the present invention are produced by a reaction of a diisocyanate and an unaturated polyester diol. Unlike prior art photoreactive polyurethanes, no added polymerizable monomer is required for crosslinking of the polyurethanes of the present invention.

The present invention also relates to an embossed material and a method for producing such an embossed material, which method comprises the steps of applying to a substrate a coating of unsaturated polyurethane as defined above in combination with a photoinitiator, embossing the polyurethane coating and thereafter irradiating the coating with actinic radiation to crosslink the polyurethane. Prior to being embossed, it is preferred that the coating be subject to drying to evaporate any solvent carrier for the polymer and curing to chain extend the polymer.

It has been found that embossed materials made by this method have sharper and deeper embossing than conventional embossed polyurethanes materials which are typically thermally crosslinked prior to embossing.

The polyurethanes utilized in the present invention should contain a sufficient amount of unsaturated sites in their polymeric backbones to permit crosslinking. However, the ideal level of unsaturated sites in the polyurethane will depend to a great extend on the end use application of the coating. For example, when the materials are to be used as coating for resilient flooring, it has been discovered that typically from about 3 to about 6 mol percent of unsaturated sites will provide for a product with the optimum wear appearance properties. In fact, the lower point of this range (at about three mole percent of unsaturated sites) is the preferred minimum level of unsaturation. This minimum level is needed for use applications requiring better performance in wear characteristics such as durability, permanence of embossing, solvent resistance, stain resistance, gloss retention, abrasion resistance, etc. The lower levels of unsaturation (less than about 3 mole percent of unsaturated sites) will be utilized for applications and uses that can tolerate lower performance in these characteristics.

The aromatic, aliphatic or alicyclic diisocyanates used to prepare the polyurethanes utilized in the coating systems of the present invention are of the general formula: OCN—R—NCO, wherein R is either R1 or R2-CH2-R3, wherein R1, R2 and R3 independently represent organic radicals selected from the group of alkyl, cycloalkyl and aryl.

The term "alkyl" is used herein to represent both straight and branched chain alkyl groups having from 1 to about 6 carbon atoms. The term "cycloalkyl" refers to a cycloalkyl group having 3 to 7 carbon atoms. The term "aryl" represents phenyl, napthyl, toluyl or xylyl radicals.

The polyester diols that are reacted with the above diisocyanate to prepare the polyurethanes utilized in the coating system of the present invention are random copolymers that generally have a number average molecular weight in the range of from about 1,500 to about 2,500, with a preferred molecular weight of about 2,000. These polyester diols are prepared by reacting at least one diacid with at least one diol. Of the diacids utilized, at least one will provide the unsaturated component in the backbone of the random polyester diol and, subsequently, in the backbone of the polyurethane itself. The preserred unsaturated diacid will be of the fumaric or maleic type such as, but not limited to, maleic acid, fumaric acid, mesaconic or citraconic acid, (which are the 2-methyl substituted derivatives of, respectively, fumaric and maleic acids).

Additional diacids that may be utilized in the preparation of the polyester diol will be of the general formula:

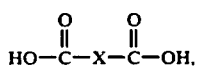

where X can be an alkyl (straight, chain or branched), alkenyl, or aryl moiety.

Diols suitable for use in the preparation of the polyester diol will be of the general formual:

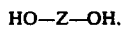

wherein Z is either Z1 or Z2-O-Z3, wherein Z1, Z2 and Z3 are independently selected from alkyl and cycloalkyl radicals.

The reactants uitlized to produce the polyurethanes utilized in the present invention must be difunctional to provide for a linear, thermoplastic polymer. The use of trifunctional reactants, such as glycerol or a triisocyanate, would result in a premature crosslinking, i.e. prior to U.V. irradiation, which would not be desirable in the present system.

The polyurethanes of the present invention are prepared by the reaction of the components specified above according to reaction conditions well known to those skilled in the art, i.e., the reaction will generally be run in a dry organic solvent medium in the presence of an appropriate tin catalyst. Typical reaction temperatures of about 100° C. will lead to the desired polyurethane formation.

In preparing a photocurable coating formulation in accordance with the present invention, the aforementioned unsaturated polyurethane is combined with a photoinitiator which is effective in initiating crosslinking of the polymer on exposure to radiation. For this purpose, the photoinitiator is advantageoulsy benzophenonone or -phenylacetophenone derivates such as benzil, benzoin and the benzoin ethers, e.g. benzoin-methyl, -ethyl, -n-propyl and -isopropyl ethers. While the amount and type of photoinitiator employed will vary with the intensity and dosage of radiant energy to be employed and the specific polyurethane being utilized, the photoinitiator is usually employed in amounts from about 1 to about 20 and preferably from about 5 to about 10 weight percent based on the weight of the resin making up the coating formulation.

In addition to the foregoing photoinitiators, other additves such as impact modifiers (rubber polymers and elastomers), pigments and fillers, stabilizers, fire retardants, etc., can be employed in the coating composition of the present invention. The specific additives utilized will depend on the desired end use of the coating composition.

After being embossed, the coating or film of the present invention is then exposed to sufficient actinic radiation to cure the coating or film to a material that is insoluble in aqueous or organic liquid media. For purposes of this invention, actinic radiation is defined as being any radiation which will cause the desired crosslinking reaction.

Examples of actinic radiation advantageously employed include ultraviolet light; accelerated particulate (oinizing) radiation wherein particulates include electrons, protons, neutrons, etc.; X-rays; and the like, with ultraviolet light being preferred. In the case of ultraviolet light radiation, suitable intensity is supplied by mercury vapor lamps.

The polyurethane coatings made according to one aspect of the present invention may be utilized to coat substrates such as resilient flooring, wood panels, paper, plastic sheets, sheet metal, structural foam and the like. The coatings are readily cast, sprayed or otherwise applied as films or coatings to substrates by conventional coating techniques employed by those skilled in the art. typically, the thickess of the film or coating will vary from about 0.025 mm to about 0.25 mm. The actual thickness utilized of course depends on the specific end use of the coating composition.

The following examples are given to illustrate embodiments of the invention and should not be construed as limitng its scope. In these examples, all parts and percentages are by weight unless otherwise indicated.

One skilled in the art will appreciate that the reaction system described herein and shown in the following examples will give a linear polymer having unsaturation only in its backbone; this means that the terminal ends of the linear polymer molecule are not unsaturated. The reaction system used here instead provides randomly distributed but internally located unsaturation. It should be appreciated that the terminal groups of the instant polymers are instead largely formed from the isocyanate group.

The polyurethanes in the following examples were moisture cured at room temperature. With polyurethane in the presence of water, moisture curing occurs whereby a condensation reaction occurs with the isocyanate end groups. In this reaction, the polymers join together. With the instant system, the polymers are not branched and therefore longer linear molecules are formed. It will also be readily appreciated that while moisture curing can be done merely at room temperature using moisture from the air as shown in the examples, more frequently, moisture curing is done using steam and, if desired, heat.

EXAMPLE 1

This example sets forth the procedure for preparing a polyurethane utilized in the present invention. The polyurethane is obtained by the reaction of a cycloaliphatic diisocyanate, 4,4'-methylenebis(cyclnexyl isocyanate), (22 wt-%) and a partially aromatic unsaturated polyester diol (78 wt-%) with an acid number 0.4 and a hydroxyl number 56 of the following formulation:

| | |
|---|---|
| Isopthalic Acid | 3.0 equivalents |
| Azelaic Acid | 10.5 equivalents |
| Fumaric Acid | 6.2 equivalents |
| Cyclohexanedimethanol | 18.2 equivalents |
| Ethylene Glycol | 4.5 equivalents |

The reactants and excess toluene are charged into a reactor equipped with a stirrer and distillation head. Sufficient toluene (100 ml.) is distilled off under a dry air stream to remove any residual moisture from the reaction mixture, and 0.06% by weight of a dimethyltindineodecanoate catalyst is added. The reaction mixture is heated at 105° C. for 20 minutes and then cooled to room temperature.

There was formed a polyurethane (4.50% solids in toluene) containing 5 mol-% unsaturation of the fumarate type.

EXAMPLE 2

The polyurethane of Example 1 was moisturecured at room temperature. The thermoplastic coating material can be readily embossed to give fine embossing detail. Addition of a photoinitiator prior to air curing (Irgacure 651R, a trademark of Ciba Geigy Corp. for dimethoxyphenylacetophenone photoinitiator) at 10 weight percent based on polymer solids provided a composition which was crosslinked by exposure to an ultraviolet light source to give a largely insoluble network. The crosslinked composition was compared in a series of tests to a non-irridiated, non-crosslinked composition to demonstrate the changes in Tg and percent insolubility in the coating. The results are set forth below:

TABLE 1

| P.I. | IRR. Time[a] | Tg | % Insol[b] |
|---|---|---|---|
| None | — | +2° C. | 0.2 |
| 10% | 5 minutes | +4° C. | 84.9 |

TABLE 1-continued

| P.I. | IRR. Time[a] | Tg | S Insol[b] |
|---|---|---|---|
| 10% | 30 minutes | +18° C. | 92.8 |

[a] Hanovia 450 W Hg lamp
[b] Toluene at 100° C.

EXAMPLE 3

This example shows the preparation of an unsaturated polyurethane and the utilization of that polyurethane in the process of the present invention. This composition is the reaction product of 4,4'-methylenebis(cyclohexyl isocyanate) (22 wt-%) and a lower fumarate content polyester diol (78 wt-%) than that of Example 1, said polyester having an acid number 0.2 and a hydroxyl number 56 and the following formulation:

| Isopthalic Acid | 4.0 equivalents |
|---|---|
| Azelaic Acid | 12.75 equivalents |
| Fumaric Acid | 3.25 equivalents |
| Cyclohexanedimethanol | 18.2 equivalents |
| Ethylene Glycol | 4.6 equivalents |

The resulting polyurethane (52.5%) solids in toluene containing 3 mole-% fumarate-type unsaturation was moisture-cured at room temperature to give a thermoplastic coating which was readily thermally embossable to give sharp, embossed images. Benzophenone was added in an amount of 5% by weight of the resin total solids, as a photoinitiator prior to air curing gave a crosslinkable film on exposure to a U.V. radiation source. Properties of the non-crosslinked and crosslinked films are tabulated below:

TABLE 2

| P.I. | IRR. Time[a] | Tg | S Insol[b] |
|---|---|---|---|
| None | — | −0.5° C. | 0.4 |
| 5% BZP | 5 minutes | +1.5° C. | 85.7 |
| 5% BZP | 30 minutes | +10.5° C. | 89.7 |

[a] & [b] same as Table 1

The unexpectedly high levels of insolubility noted in this example is based on the use of a different photoinitiator (benzophenone) which appears to be highly efficient.

EXAMPLE 4

This composition is a totally aliphatic polyurethane obtained by the reaction of 4,4'-methylenebis(cyclohexyl isocyanate) (21 wt-%) with an unsaturated polyester diol (79 wt-%) based on maleic acid as the unsaturated component, said polyester having an acid number 0.2 and a hydroxyl number 54 and the following formulation:

| Azelaic Acid | 14.0 equivalents |
|---|---|
| Maleic Anhydride | 6.0 equivalents |
| Cyclohexanedimethanol | 22.8 equivalents |

The resulting polyurethane (40.5% solids in toluene) contained 5 mol-% maleate-type unsaturation. After adding 10% by weight of Irgacure 651 ®, a photoinitiator, the polyurethane was moisture-cured at room temperature to give a thermoplastic coating material which will have detailed, embossed images upon thermal embossing. The polyurethane was then crosslinked by exposure to a U.V. light source. Properties of the non crosslinked and crosslinked films are tabulated below:

TABLE 3

| P.I | IRR. Time[a] | Tg | S Insol[b] |
|---|---|---|---|
| None | — | +4.5° C. | 0.3 |
| 10% | 5 minutes | +2° C. | 72.9 |
| 10% | 30 minutes | +4° C. | 84.4 |

[a] & [b] same as Table 1.

EXAMPLE 5

This composition is a totally aliphatic polyurethane obtained by the reaction of 4,4'-methylenebis(cyclohexyl isocyanate) 21 wt-%) with an unsaturated polyester diol (79 wt-%) based on maleic acid as the unsaturated component, said polyester having an acid number 1.3 and a hydroxyl number 56 and the following formulation:

| Azelaic Acid | 14.0 equivalents |
|---|---|
| Maleic Anhydride | 6.0 equivalents |
| 1,6-Hexanediol | 5.0 equivalents |
| Cyclohexanedimethanol | 17.8 equivalents |

The resulting polyurethane (40.5% solids in toluene) contained 4.3 mole-% maleate-type unsaturation.

EXAMPLE 6

To the toluene solution of the polyurethane of Example 5 was added, 10% (by weight of resin solids) of dimethoxyphenylacetophenone photoinitiator, and the resulting photocrosslinkable coating composition was applied to a bond paper substrate at an application rate of 3.5 grams/ft². The coated substrate was dried in an impingement air oven at 250° F. for three minutes to give a 0.5 mil thick tack-free coating. The coated paper was embossed at 230° F. for ten seconds in a flat bed press to give a 20 mil deep decorative texture. Exposure of the embossed coatd paper to 1.0 J/cm² UV irradiation from a medium pressure mercury lamp crosslinked the coating, resulting in a permanent embossed texture.

EXAMPLE 7

The photocrosslinkable coating composition of Example 6 was applied with a wire wound rod to a 4 mils thick poly(ethyleneterephthalate) film at a rate of 3.5 g/ft² and the coated film was dried in an oven at 250° F. for three minutes. The coated substrate was embossed at 250° F. in a flat bed press for ten seconds to give a lenticular image of 100 dots/in². Ultraviolet irradiation at a dose of 3.0 J/cm² resulted in a permanently embossed coated polyester film.

EXAMPLE 8

The photocrosslinkable coating composition of Example 6 was applied to a woven nylon fabric at an application rate of 3.5 g/ft² and the saturated web was dried in an oven at 250° F. for three minutes to give a tackfree, flexible coated fabric. Embossing in a flat bed press at 225° F. for ten seconds gave a multi-level textured image which was made permanent by exposure of the web to 1.0 J/cm2 UV irradiation from a medium pressure mercury lamp.

PERFORMANCE AFTER CROSSLINKING

Comparing polyurethane samples at different levels of unsaturation, it can be noted that as crosslinking increases with higher levels of unsaturation, the following particularily desired characteristics improve:
(a) abrasion resistance.
(b) gloss retention
(c) stain resistance
(d) percent insolubility Since in many cases, the instant product compositions are desired for use as flooring materials, these characteristics are particularily important, and, the minimum preformance levels required, understandably are high.

As the unsaturation level decreases, the performance level in these desired characteristics will also decrease. Samples having had only 3 mole percent unsaturation will give test values, showing approximately the minimum acceptable performance level for compositions to be used in flooring materials. Samples having more unsaturation and a higher level of crosslinking will show better performance for these characteristics.

What is claimed is:

1. A photocurable film that will cure upon exposure to actinic radiation comprising:
   a non-liquid, tack-free thermoplastic material which can be embossed until it is photocured consisting essentially of:
   (1) a photoinitiator, and
   (2) a moisture-cured linear polyurethane, having sites of unsaturation only in its polymer backbone, said polyurethane being produced by the reaction of a diisocyanate and an unsaturated polyester diol, and then moisture-curing the polyurethane produced further providing that the polyester diol was prepared by reacting a diol and an unsaturated diacid in an amount needed to give an unsaturation level of at least about 3 mole percent to the linear polyurethane.

2. A film as described in claim 1 wherein the diisocyanate is an aromatic, aliphatic or acyclic diisocyanate of the general formula:

OCN—R—NCO wherein R is either R1 or R2-CH$_2$-R3 wherein R1, represents, and R2 and R3 can independently represent, organic radicals selected from the group consisting of:
(a) a straight or branched chain alkyl group having from 1 to 6 carbon atoms;
(b) a cycloalkyl group having from 3 to 7 carbon atoms;
(c) a phenyl radical;
(d) a naphthhyl radical;
(e) a toluyl radical; and
(f) a xylyl radical; and wherein the unsaturation level is provided by the diacid in an amount of from about 3 to about 6 mole percent.

3. The film of claim 1 wherein the photoinitiator is benzophenone, phenylacetophenone or a derivative thereof.

4. A photocureable coating system which is adaptable to being crosslinked upon exposure to actinic radiation, said system consisting essentially of:
(a) a moisture-cured linear polyurethane that contains sites of unsaturation only in its polymeric backbone, said polyurethane being produced by the reaction of a diisocyanate and an unsaturated polyester diol said diol having sites of unsaturation in its backbone, followed by moisture-curing; further providing that the unsaturated polyester diol is a random copolymer with a number average molecular weight in the range of from about 1,500 to about 2,500; and was produced by the reaction of a diol and an unsaturated diacid in an amount needed to give at least about 3 mole percent unsaturation, to the polyurethane and
(b) a photoinitiator further providing that (a) and (b) together provide a non-liquid tack-free embossable thermoplastic which can be embossed before it is crosslinked.

5. The coating system of claim 4 wherein the unsaturated diacid provides an unsaturation level of from about 3 to about 6 mole percent of unsaturated sites.

6. The coating system of claim 4 wherein the unsaturated diacid is fumaric or maleic acid.

7. The coating system of claim 4 wherein the photoinitiator is benzophenone, phenylacetophenone or a derivative thereof.

8. A photocurable film that will cure upon exposure to actinic radiation, comprising
   a non-liquid, tack-free, thermoplastic material which can be embossed before it is crosslinked, the said material consisting essentially of:
   (1) a photoinitiator, and
   (2) a moisture-cured linear polyurethane having sites of unsaturation only in its polymer backbone, said polyurethane being produced by the reaction of a diisocyanate and an unsaturated polyester diol and then moisture curing, wherein the diisocyanate is an aromatic, aliphatic or acylic diisocyanate of the general formula:

OCN—R—NCO wherein R is either R1 or R2-CH$_2$-R3 wherein R1, represents, and R2 and R3 can independently represent, organic radicals selected from the group consisting of:
(a) a straight or branched chain alkyl group having from 1 to 6 carbon atoms;
(b) a cycloalkyl group having from 3 to 7 carbon atoms;
(c) a phenyl radical;
(d) a naphthyl radical;
(e) a toluyl radical; and
(f) a xylyl radical; and wherein the unsaturated polyester diol is a random copolymer having sites of unsaturation in its backbone, and a number average molecular weight in the range of from about 1,500 to about 2,500, wherein further the said polyester diol was produced by the reaction of a diol and an unsaturated diacid.

9. A photocurable coating system which is adaptable to being crosslinked upon exposure to actinic radiation, said system consisting essentially of:
(a) a moisture-cured linear polyurethane that contains sites of unsaturation only in its polymeric backbone, said polyurethane being produced by the reaction of a diisocyanate and an unsaturated polyester diol followed by moisture-curing, wherein further the unsaturated polyester diol is a random copolymer having sites of unsaturation in its backbone provided by an unsaturated diacid, the said polyester diol having a number average molecular weight in the range of from about 1,500 to about 2,500; and
(b) a photoinitiator, further providing that (a) and (b) together provide a non-liquid, tack-free, embossable thermoplastic which can be embossed before it is crosslinked.

10. The coating system of claim 9 wherein the photoinitiator is benzophenone, phenylacetophenone or a derivative thereof.

11. The coating system as described in claim 9 which also includes a fire-retardant.

12. The coating system as described in claim 9 wherein the unsaturated diacid is maleic acid or fumaric acid.

13. The coating system as described in claim 9 wherein the photoinitiator is used in an amount of from about 1 to about 20 weight percent.

14. The coating system as described in claim 13 wherein the linear polyurethane has an unsaturation level in an amount of from about 3 to about 6 mole percent of unsaturated sites from the unsaturated diacid.

* * * * *